(12) United States Patent
Paterson (10) Patent No.: US 12,529,158 B2
(45) Date of Patent: Jan. 20, 2026

(54) ELECTROWINNING CELL

(71) Applicant: Greengold Engineering Pty Ltd, Perth (AU)

(72) Inventor: Malcolm Roy Paterson, Perth (AU)

(73) Assignee: Greengold Engineering Pty Ltd, Perth (AU)

( * ) Notice: Subject to any disclaimer, the term of this patent is extended or adjusted under 35 U.S.C. 154(b) by 761 days.

(21) Appl. No.: 17/796,220

(22) PCT Filed: Jan. 27, 2021

(86) PCT No.: PCT/AU2021/000007
§ 371 (c)(1),
(2) Date: Jul. 28, 2022

(87) PCT Pub. No.: WO2021/151139
PCT Pub. Date: Aug. 5, 2021

(65) Prior Publication Data
US 2023/0077321 A1    Mar. 16, 2023

(30) Foreign Application Priority Data

Jan. 28, 2020 (AU) ............................. 2020900219

(51) Int. Cl.
| | | |
|---|---|---|
| C25C 7/00 | (2006.01) | |
| C25C 1/20 | (2006.01) | |
| C25C 7/02 | (2006.01) | |
| C25C 7/04 | (2006.01) | |
| C25C 7/06 | (2006.01) | |

(52) U.S. Cl.
CPC ............. C25C 7/06 (2013.01); C25C 1/20 (2013.01); C25C 7/02 (2013.01); C25C 7/04 (2013.01)

(58) Field of Classification Search
CPC ...... C25C 7/06; C25C 1/20; C25C 7/02; C25C 7/04; C25C 1/00
See application file for complete search history.

(56) References Cited

U.S. PATENT DOCUMENTS

| | | | |
|---|---|---|---|
| 5,324,396 A * | 6/1994 | Ferron | C25C 7/06 205/571 |
| 5,725,744 A | 3/1998 | de Nora et al. | |
| 6,139,704 A * | 10/2000 | de Nora | C04B 41/5025 204/290.13 |
| 6,689,507 B1 * | 2/2004 | Tsutsumi | H01M 50/73 429/218.2 |
| 6,866,768 B2 | 3/2005 | Bradford et al. | |
| 8,025,785 B2 | 9/2011 | De Nora | |

OTHER PUBLICATIONS

International Search Report and Written Opinion, PCT/AU2021/000007, Mar. 31, 2021.

* cited by examiner

Primary Examiner — Zulmariam Mendez
(74) Attorney, Agent, or Firm — Patterson + Sheridan, LLP (57) ABSTRACT

An electrowinning cell for extracting metals from an electrolyte solution, the electrowinning cell comprising a housing, a solution inlet, a solution outlet, a plurality of anodes, a plurality of cathodes and a product outlet, wherein at least one anode is substantially impermeable and configured to maintain a gap between a lower edge of the anode and the housing, so that fluid flow of solution is directed below the anode, and wherein at least one cathode is secured at a lower edge to the housing to prevent fluid flow below the lower edge of the cathode.

22 Claims, 7 Drawing Sheets

ELECTROWINNING CELL

FIELD OF THE INVENTION

The present invention relates to an electrowinning cell.

More particularly, the present invention relates to an electrowinning cell for gold and/or silver recovery having improved performance in situations where the solution processed contains quantities of secondary metals in addition to gold.

BACKGROUND

The most prevalent method of gold (Au) recovery in commercial mining is by using cyanidation to leach the gold from the ore, followed by adsorption.

The adsorbent loaded with gold is fed into an elution column, where an eluant washes the gold from the adsorbent, creating a pregnant electrolyte solution.

The pregnant solution is then circulated through an electrowinning cell, in which the electrowinning process removes the gold, and the barren solution is fed back to an eluant or pregnant solution tank.

Electrowinning involves immersing an array of anodes and cathodes in the pregnant electrolyte solution, and passing a current from an anode to a cathode, so that the metal is deposited onto the cathode, and is therefore extracted from the solution.

The conventional structure of electrowinning cells comprises a number of cathodes arranged in series, with anode plates positioned between the cathodes. The anodes and cathodes are suspended in a bath of pregnant electrolyte solution, which allows a pregnant electrolyte solution to pass from an inlet to an outlet of the cell, through all of cathodes in sequence.

The cathode plates are commonly comprised of a frame wrapped in steel wool, to provide greater surface area for metal deposition.

The anodes are commonly formed of a plate with multiple holes to allow passage of solution.

The electrolytic process causes the gold and other secondary metals to be deposited on the cathodes, forming a plating on the surface.

Once sufficiently plated, the cathodes are removed from the cell and the deposited metal is washed from the cathode using high pressure water jets, so that the cathodes can be returned to the electrowinning cell. if the gold is plated coherently and unable to be washed from the cathode, the loaded steel wool is removed and calcined.

Where the ore contains other metals, for example silver (Ag) and copper (Cu) these other metals will be processed with the gold, being adsorbed into the adsorbent, and then into the pregnant electrolyte solution.

As some other metals, particularly silver and copper, have positive reductive potential, similar to gold, the secondary metals are also attracted to the steel wool cathodes during the electrowinning process.

It is common for ore bodies to contain high volumes of secondary metals in addition to gold, and the prevalence of these metals as they reach the electrowinning cells causes the steel wool cathodes to become clogged with the secondary metals, thus reducing the efficiency of the cells.

When the cathodes become clogged, the solution can no longer pass through the cathode, and is directed over the top of the cathode, and flows through the subsequent anode.

Consequently, the build-up of metal causes the cathodes to become impermeable, and flow of solution to be primarily over the top of the clogged cathode.

The cathodes do not experience deposition, and flow continues through the holes of the anode.

As a result of the fluid flow of solution passing over the top of the clogged cathodes, and then through the holes of the anodes, the fluid flow becomes focussed toward an upper portion of the cell, and the efficiency of plating is significantly reduced with the lower portions.

Once the solution can no longer circulate effectively, the cathodes are removed and the plating is washed off using a high pressure water jet.

At this stage of the process the plating on the cathodes has a high level of purity and is therefore very valuable. Any loss of product is therefore particularly undesirable.

The process of removal of the cathodes, and subsequent pressure washing can result in the loss or contamination of product, and any improvements to prevent loss of product are beneficial.

As the inclusion of secondary metals in the pregnant electrolyte solution causes the cathodes to become clogged more easily than if the solution contained only gold, the problem of removal and washing of the cathodes is exacerbated where secondary metals are more prevalent, as it must be performed more frequently.

The present invention attempts to overcome at least in part the aforementioned disadvantages of previous electrowinning cells by providing a cell which has increased plating efficiency, reduces the time between cathode washes and/or reduces the likelihood of loss of product during the cathode washing procedure.

SUMMARY OF THE INVENTION

In accordance with one aspect of the present invention there is provided an electrowinning cell for use in a gold or silver recovery circuit, the electrowinning cell comprising a housing, a solution inlet, a solution outlet, a plurality of anodes, a plurality of cathodes and a product outlet, wherein at least one anode is impermeable and configured to permit fluid flow of solution between a lower edge of the anode and the housing, so that solution passing from the inlet to the outlet is directed below the anode.

In accordance with another aspect of the present invention there is provided an electrowinning cell for extracting metals from an electrolyte solution, the electrowinning cell comprising a housing, a solution inlet, a solution outlet, a plurality of anodes, a plurality of cathodes and a product outlet, wherein at least one anode is substantially impermeable and configured to maintain a gap between a lower edge of the anode and the housing, so that fluid flow of solution is directed below the anode, and wherein at least one cathode is secured at a lower edge to the housing to prevent fluid flow below the lower edge of the cathode.

Preferably, the gap between the lower edge of the anode and the housing defines a pocket that has a cross-sectional area equal to or greater than the horizontal cross-sectional area between the anode and cathode.

Preferably, the cell is configured to extract gold and silver from an electrolyte solution, wherein the electrolyte solution has a greater content of silver than gold.

Preferably, the cell is configured to extract gold and silver from an electrolyte solution, wherein the electrolyte solution contains at least 50% as much silver as gold.

Preferably, the electrowinning cell comprises an optimal surface level of solution, wherein the anode comprises an upper edge located above the surface level, and wherein the cathode comprises an upper edge below the surface level.

Preferably, the upper edge of the cathode is between 10 mm and 20 mm below the surface level.

Preferably, the upped edge of the anode is between 5 mm and 10 mm above the surface level.

Preferably, the plurality of anode plates and cathode plates are arranged using spacers to ensure that spaces between plates arc maintained, so that the fluid flow path of solution is not encumbered.

Preferably the anodes and cathodes are arranged in pairs, so that fluid flow of solution is directed below each anode, and prevented from flowing below each cathode, in an alternating series.

Preferably the cathodes are configured as frames wrapped with steel wool.

Alternatively, the cathodes are configured as mesh plates, or plates with holes.

Preferably, the anode plates are solid steel plates.

Preferably, the lower edge of each cathode is secured to a divider on the base of the housing.

Preferably, the electrowinning cell comprises a plurality of product outlets at the base of the housing, wherein each product outlet is positioned between dividers, below each respective anode.

Preferably, each product outlet is associated with a pocket between the lower edge of each anode and the housing.

Preferably, the anodes and cathodes are secured proximal the upper edge to a conductor bar.

Preferably the conductor bar is electrically isolated, more preferably using a rubber insulator.

Preferably the rubber insulator is shaped to locate the anode or cathode in position, as well as provide electrical insulation.

Preferably each conductor bar is connected to a bus bar located external to the housing.

Preferably two bus bars are provided, one running down each side of the cell, with the conductor bars of the anodes connected to one bus bar, and the conductor bars of the cathodes connected to the other bus bar.

More preferably, the bus bars are connected to the conductor bars with bolted electrical connections. The electrical connections are preferably located external to the housing of the cell, so that they are not exposed to the corrosive environment inside the housing.

More preferably, the electrowinning cell further comprises an exhaust nozzle, configured to have suction applied.

Preferably the bus bars and electrical connections are protected by covers to prevent damage to the electrowinning cell, or injury to operators.

Preferably the covers comprise holes, wherein the holes are positioned proximal the electrical connections, so that when suction is applied to the exhaust nozzle, air is drawn through the holes and over the electrical connections Preferably the cell has a lid to keep the housing substantially enclosed and prevent exposure of operators to the corrosive environment inside the housing.

It is acknowledged that the cell may comprise a further anode or cathode in addition to the pairs of each.

It is also acknowledged that the configuration of the anodes and cathodes may be reversed, so that the fluid flow of the solution is directed over the anodes, and under the cathodes.

It is also acknowledged that an alternative arrangement, where the space between each anode or cathode and the housing may be at the sides of the housing, so that the fluid flow path of the solution is directed from side to side, rather than up and down.

In accordance with another aspect of the present invention there is provided an electrowinning cell for use in a gold or silver recovery circuit, the electrowinning cell comprising a housing, a solution inlet, a solution outlet, a plurality of anodes, a plurality of cathodes and a product outlet, wherein at least one anode is configured to maintain a gap between a lower edge of the anode and the housing, so that at least a portion of fluid flow of solution is directed below the anode, and wherein at least one cathode is secured at a lower edge to the housing to prevent fluid flow below the lower edge of the cathode.

In accordance with another aspect of the present invention there is provided an arrangement of electrowinning cells for extracting metals from an electrolyte solution, wherein the electrowinning cell comprises; a housing, a solution inlet, a solution outlet, a plurality of anodes, a plurality of cathodes and a product outlet, wherein each anode is configured to maintain a gap between a lower edge of the anode and the housing, so that at least a portion of fluid flow of solution is directed below the anode, and wherein at least one cathode is secured at a lower edge to the housing to prevent fluid flow below the lower edge of the cathode; wherein the arrangement comprises electrowinning cells connected to one another in series, so that fluid flow of solution is directed from a first cell via subsequent downstream cells to a final cell, and wherein the cells are arranged with different degrees of anode permeability. Preferably, an upstream cell in the arrangement comprises a greater degree of anode permeability than at least one of the downstream cells.

BRIEF DESCRIPTION OF DRAWINGS

The present invention will now be described, by way of example, with reference to the accompanying drawings, in which.

DESCRIPTION OF PREFERRED EMBODIMENTS

Figure 1:
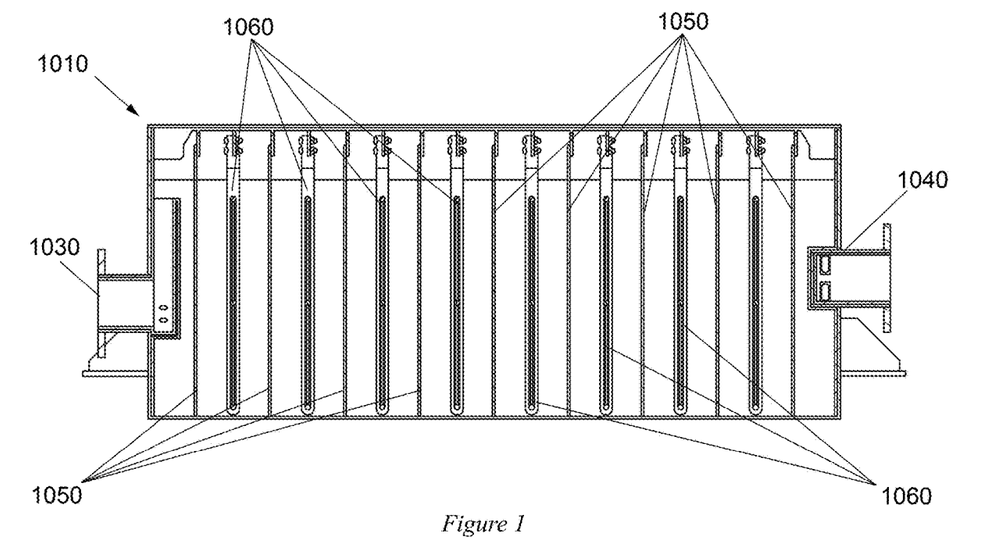
FIG. 1 is a cross-sectional view of a conventional electrowinning cell, showing the key features including the anodes and cathodes in position as is known in the art.
Figure 2:
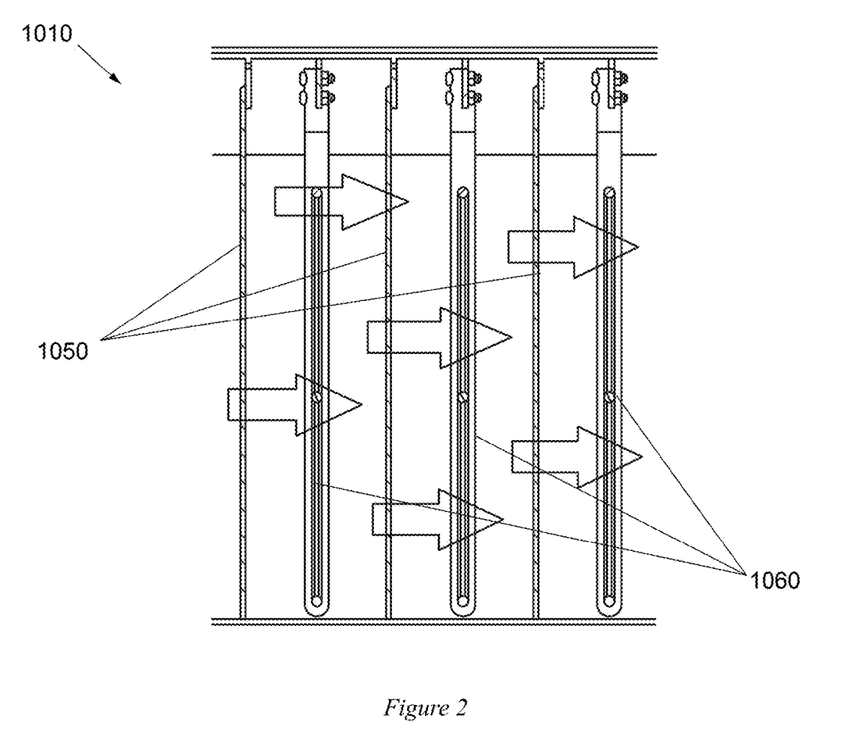
FIG. 2 is a partial cross-sectional view of a conventional electrowinning cell, showing the direction of fluid flow, through the anodes and cathodes as is known in the art.

Referring to FIGS. 1 and 2, there is shown a conventional electrowinning cell 1010, in which the anodes 1050 and cathodes 1060 are permeable and are arranged to provide flow of solution from the inlet 1030 to the outlet 1040 through both the anodes 1050 and the cathodes 160.

The passage of solution from inlet 1030 to outlet 1040 is conventionally taken via a substantially direct path, and the gold and secondary metals are deposited onto the cathodes 1060 and the steel wool forming the surface area thereof.

Figure 3:
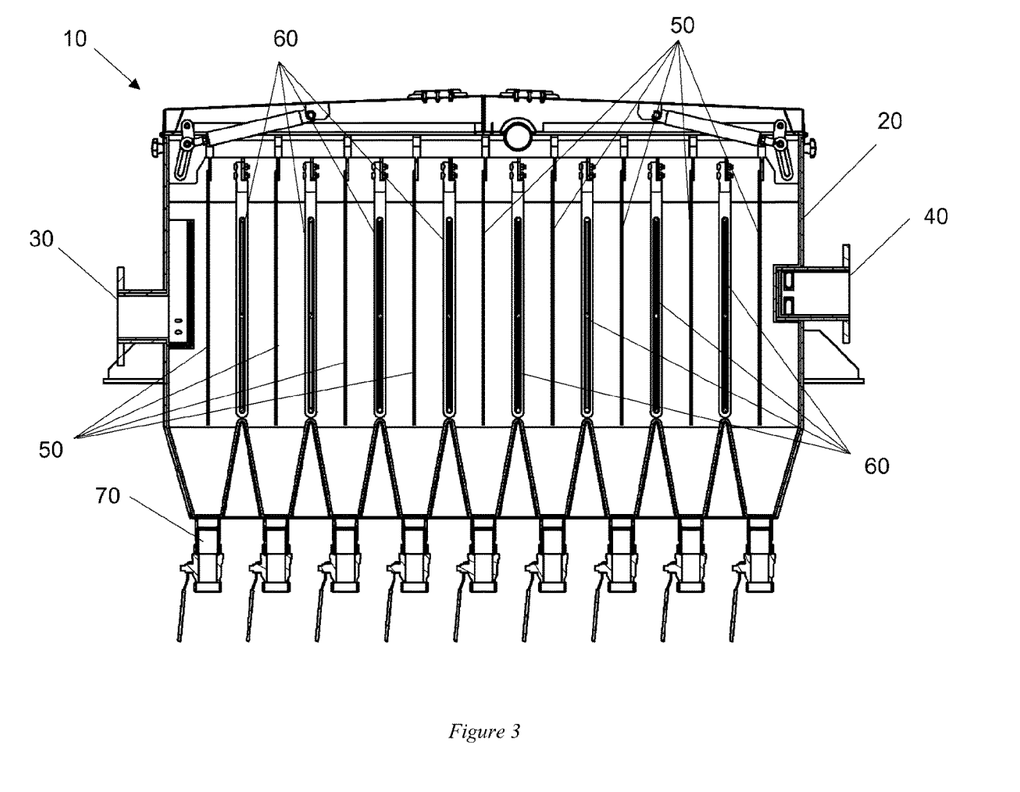
FIG. 3 is a cross-sectional view of an electrowinning cell according to an embodiment of the present invention, showing the anodes and cathodes in position, and the position of the product outlets.

Referring to FIG. 3, there is shown an electrowinning cell 10 for use in a gold or silver recovery circuit according to an embodiment of the present invention, the electrowinning cell 10 comprising a housing 20, a solution inlet 30, a solution outlet 40, a plurality of anodes 50, a plurality of cathodes 60 and a product outlet 70, wherein at least one anode 50 is impermeable and configured to permit fluid flow of solution between a lower edge 52 of the anode 50 and the housing 20, so that solution passing from the inlet 30 to the outlet 40 is directed below the anode 50.

Alternatively, there is provided an electrowinning cell 10 for extracting metals from an electrolyte solution, the electrowinning cell 10 comprising a housing 20, a solution inlet 30, a solution outlet 40, a plurality of anodes 50, a plurality of cathodes 60 and a product outlet 70, wherein at least one anode 50 is substantially impermeable and configured to maintain a gap between a lower edge 52 of the anode 50 and the housing 20, so that fluid flow of solution is directed below the anode 50, and wherein at least one cathode 60 is secured at a lower edge 62 to the housing 20 to prevent fluid flow below the lower edge 62 of the cathode 60.

The gap between the lower edge 52 of the anode 50 and the housing 20 may define a pocket that has a cross-sectional area equal to or greater than the horizontal cross-sectional area between the anode 50 and cathode 60.

The electrowinning cell 20 may be configured to extract gold and silver from an electrolyte solution, wherein the electrolyte solution has a greater content of silver than gold.

The electrowinning cell 20 may be configured to extract gold and silver from an electrolyte solution, wherein the electrolyte solution contains at least 50% as much silver as gold.

The electrowinning cell 20 may comprise an optimal surface level of solution, wherein the anode 50 comprises an upper edge 54 located above the surface level, and wherein the cathode 60 comprises an upper edge 64 below the surface level.

The upper edge 64 of the cathode 60 may be between 10 mm and 20 mm below the surface level.

The upper edge 54 of the anode 50 may be between 5 mm and 10 mm above the surface level.

The anodes 50 and cathodes 60 may be arranged in pairs, so that fluid flow of solution is directed below each anode 50, and prevented from flowing below each cathode 60, in an alternating series.

Figure 4A:
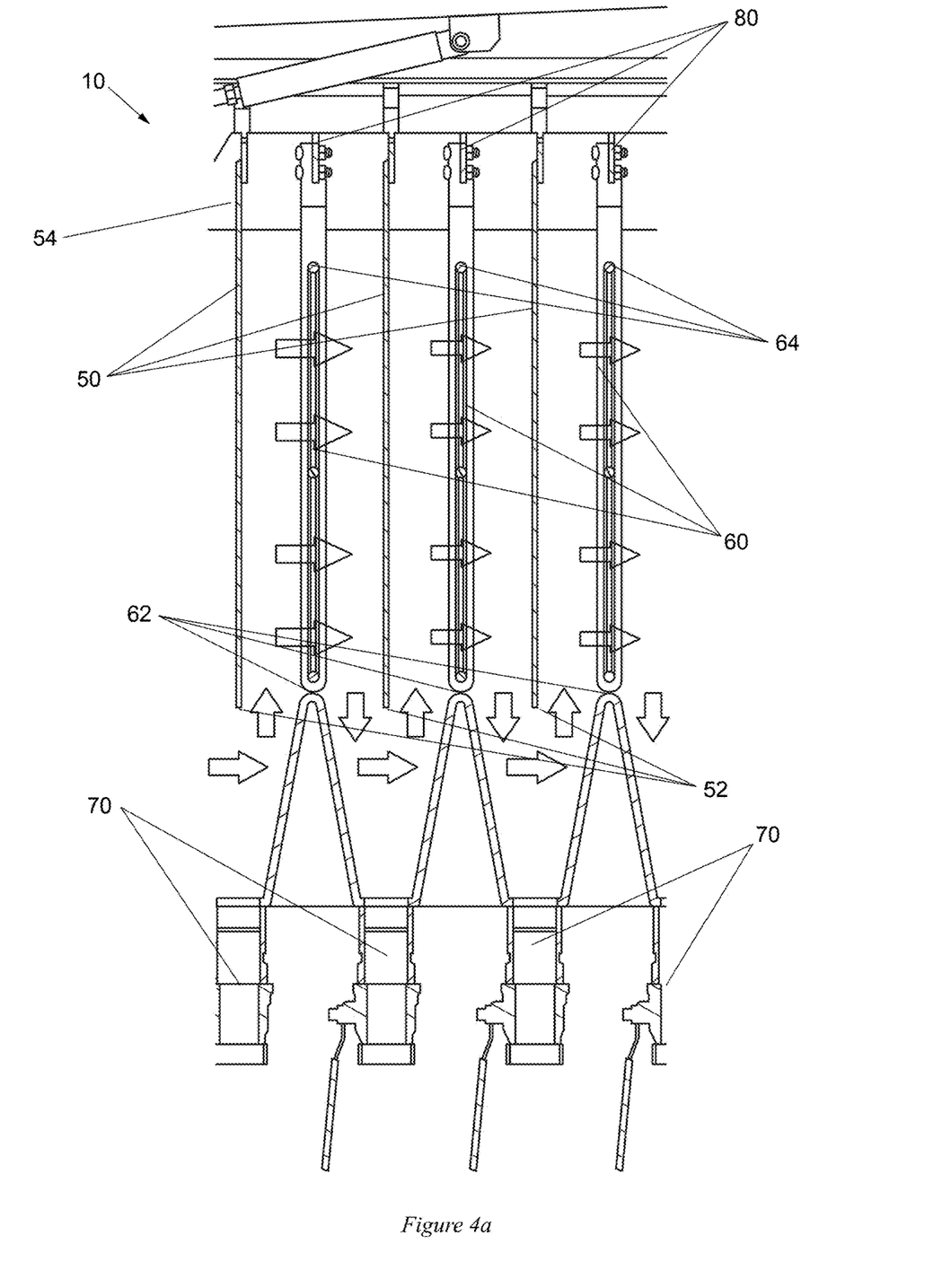
FIG. 4*a* is a partial cross-sectional view of an electrowinning cell according to an embodiment of the present invention, showing the fluid flow path where the cathodes remain permeable.
Figure 4B:
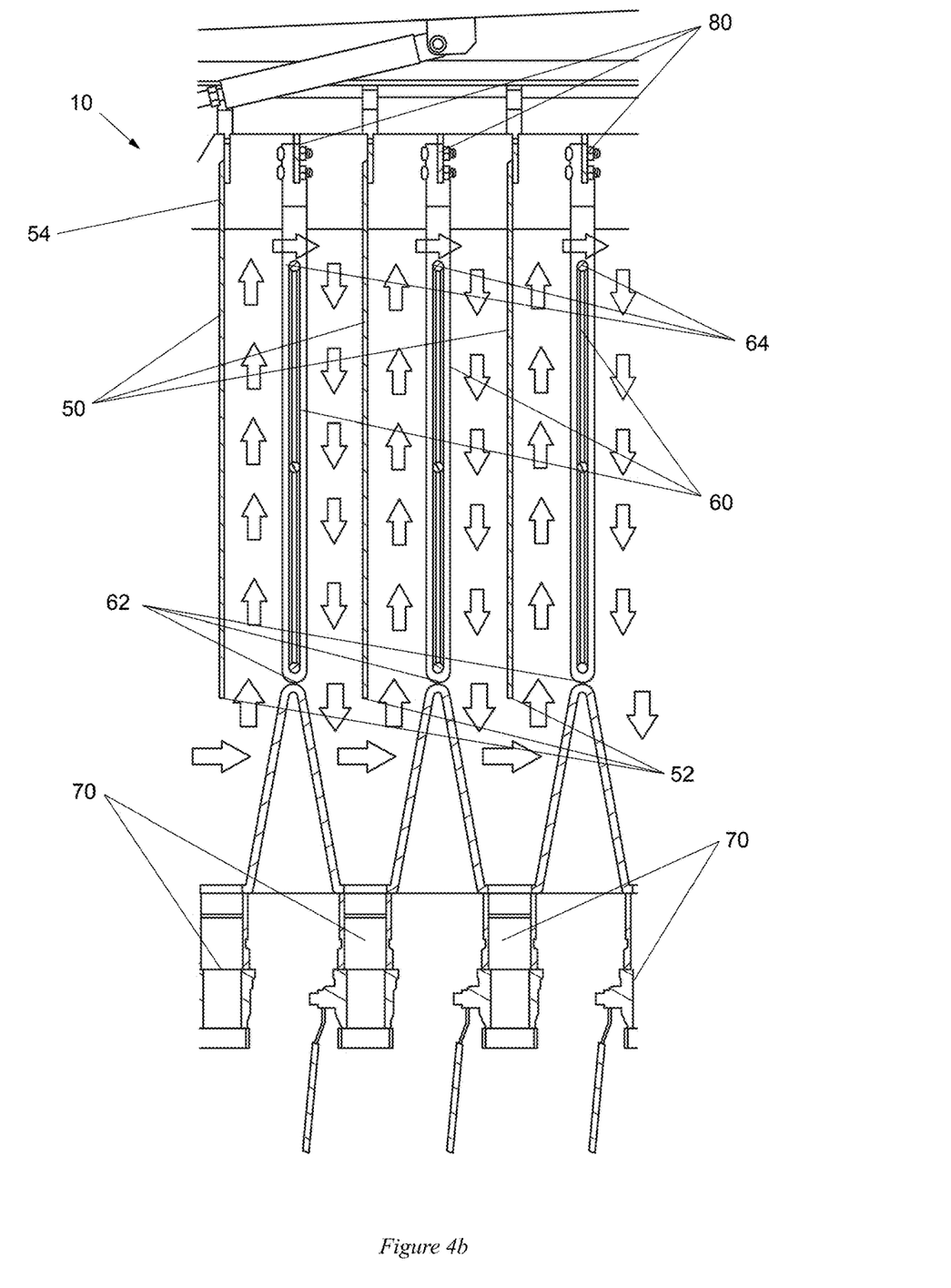
FIG. 4*b* is a partial cross-sectional view of an electrowinning cell according to an embodiment of the present invention, showing the fluid flow path where the cathodes have become substantially impermeable.
Figure 5:
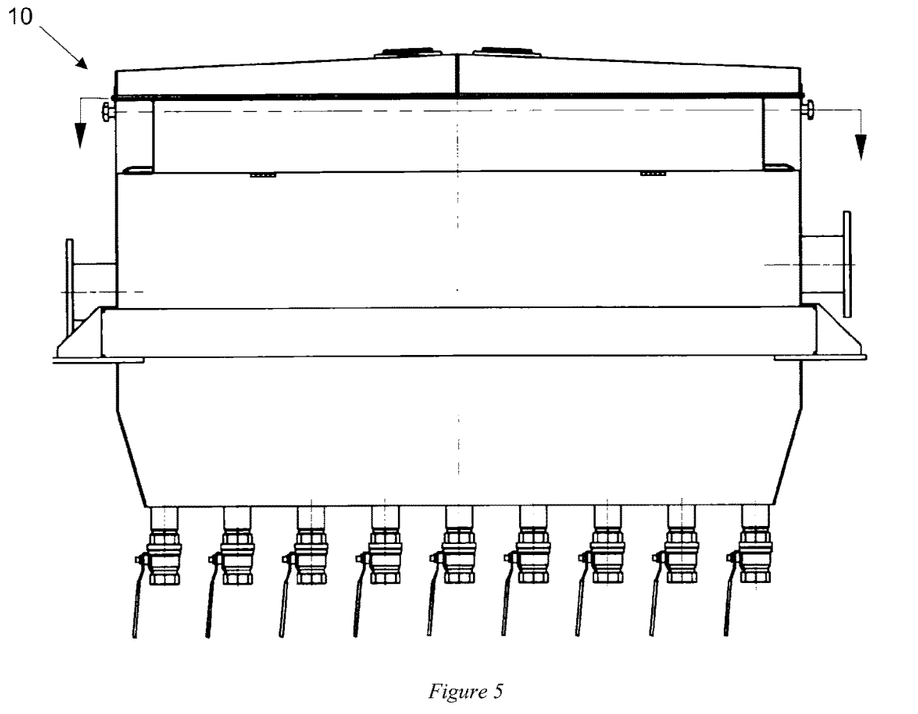
FIG. 5 is a side elevation of an electrowinning cell according to an embodiment of the present invention, having a section line drawn across.

As shown in FIGS. 4a and 4b, the fluid flow of solution is permitted between a lower edge 52 of the anode 50 and the housing 20, so that the solution is directed below the anode 50.

Referring to FIG. 4a, which shows the arrangement of anodes 50 and cathode 60 when the cathodes 60 are permeable, and the fluid flow of solution therefore passing through the cathodes 60, and below the anodes 50.

Referring to FIG. 4b, which shows the arrangement of anodes 50 and cathode 60 when the cathodes 60 are impermeable, and the fluid flow of solution is therefore up and over the cathodes 60, and below the anodes 50.

When the metal deposition causes the cathode 60 to become impermeable the fluid flow path of the solution is directed below the anode 50 and over the top of the cathode 60 in an alternating sequence.

It is acknowledged that the cell may comprise a further anode 50 or cathode 60 in addition to the pairs of each, which may be for a number of reasons, including ease of manufacture and assembly.

In fact, one preferred embodiment of the present invention comprises nine anodes 50 and eight cathodes 60.

It is also acknowledged that the arrangement of anodes 50 and cathodes 60 may be reversed, so that solution is permitted to pass over the uppermost edges of the anodes 50, and below the lowermost edges of the cathodes 60.

It is also acknowledged that an alternative arrangement could be considered, where the space between each anode 50 or cathode 60 and the housing 20 may be at the sides of the housing 20, so that the fluid flow path of the solution is directed from side to side, rather than up and down.

The anodes 50 may be steel plates.

The anodes 50 may be stainless steel plates.

Alternatively, the anodes 50 may be a suitably conductive material that is corrosion resistant.

The cathodes 60 may comprise a frame wrapped in steel wool to increase the surface area.

Alternatively, the cathodes 60 may be configured as mesh plates, or plates with holes.

The lower edge 64 of each cathode 60 may be secured to a divider 66 on the base of the housing 20.

The electrowinning cell 10 may further comprise a plurality of product outlets 70 at the base of the housing 20, wherein each product outlet 70 is positioned between dividers 66, below each respective anode 50.

Each product outlet 70 may be associated with a pocket between the lower edge 52 of each anode 50 and the housing 20.

The anodes 50 and cathodes 60 may be secured proximal their upper edges 54, 64 to conductor bars 80.

Each conductor bar 80 may be electrically isolated, which may be achieved with a rubber insulator 82.

The rubber insulator 82 may be shaped to locate the anode 50 or cathode 60 in position, as well as provide electrical insulation.

Figure 6:
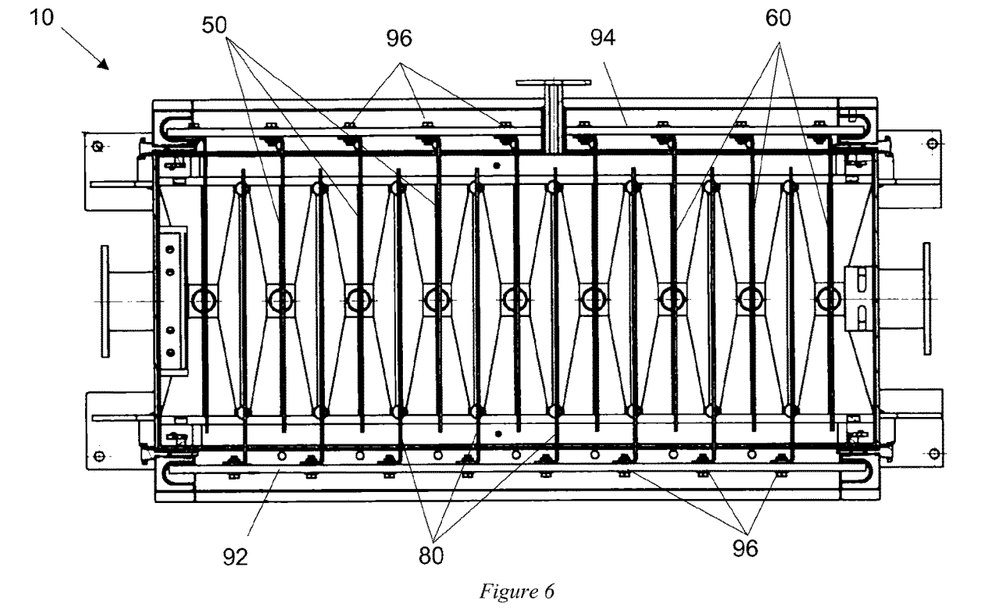
FIG. 6 is a section view of an electrowinning cell according to an embodiment of the present invention, the section being shown according to the section line of FIG. 5.
Figure 7:
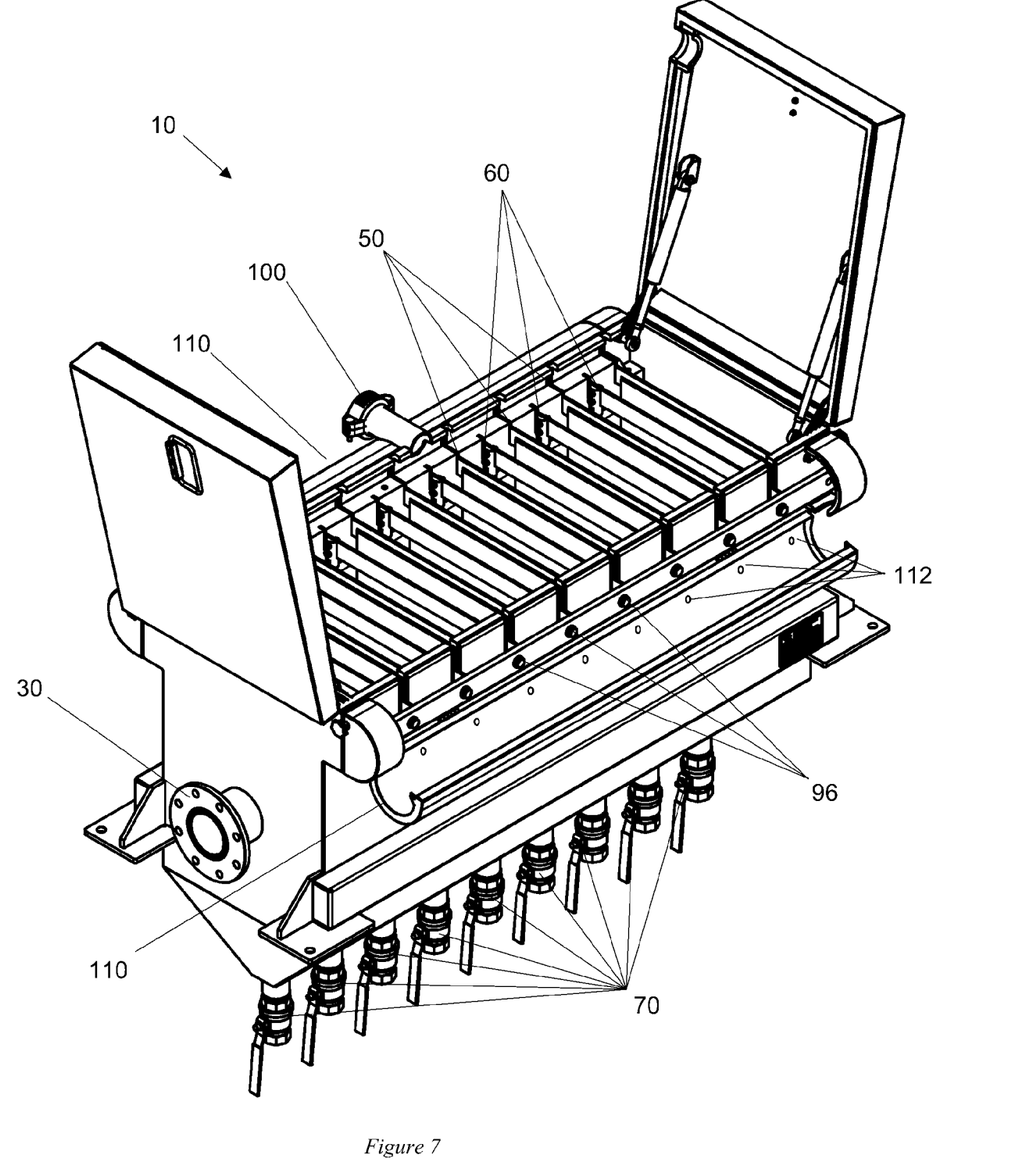
FIG. 7 is an isometric view of an electrowinning cell according to an embodiment of the present invention.

As shown in FIGS. 6 and 7, each conductor bar 80 may be connected to a bus bar 90 located externally to the housing 20.

Two bus bars 90 may be provided, with one running down each side of the housing 20, the two being defined as an anode bus bar 92 and a cathode bus bar 94.

In this embodiment the conductor bars 80 of the anodes 50 are connected to the anode bus bar 92, and the conductor bars 80 of the cathodes 60 are connected to the cathode bus bar 94.

The bus bars 90 may be connected to the conductor bars 80 with bolted electrical connections 96. The electrical connections 96 may be made external to the housing 20, so that they are not exposed to the corrosive environment inside the housing 20.

The electrowinning cell 10 may further comprise an exhaust nozzle 100, configured to enable suction to be applied to draw gas from the environment inside the housing 20.

The electrowinning cell 10 may comprise covers 110 to protect the bus bars 90 and electrical connections 96. The protection may be from damage from external factors, and may also protect operators from being exposed to the electrical connections 96 and the corrosive environment inside the cell 10.

The covers 110 may further comprise a plurality of holes 112 along the length of the cover. The hole 112 may be located proximal the electrical connections 96, and may be configured to draw air from outside the housing 20 over the electrical connections 96 when suction is applied to the exhaust nozzle 100.

The electrowinning cell 10 may comprise a lid to keep the housing 20 substantially enclosed and prevent exposure of operators to the corrosive environment inside the housing 20.

The product outlets 70 may direct the concentrate from the housing 20 to one or more containers.

In another embodiment of the present invention, also depicted in FIGS. 3 to 7, there is provided an electrowinning cell 10 for use in a gold or silver recovery circuit, the electrowinning cell 10 comprising a housing 20, a solution inlet 30, a solution outlet 40, a plurality of anodes 50, a plurality of cathodes 60 and a product outlet 70, wherein at least one anode 50 is configured to maintain a gap between a lower edge 52 of the anode 50 and the housing 20, so that at least a portion of fluid flow of solution is directed below the anode 50, and wherein at least one cathode 60 is secured at a lower edge 62 to the housing 20 to prevent fluid flow below the lower edge 62 of the cathode 60.

In this embodiment the anode 50 may be permeable, and at least a portion of fluid flow of solution may be directed below the anode 50.

Figure 8:
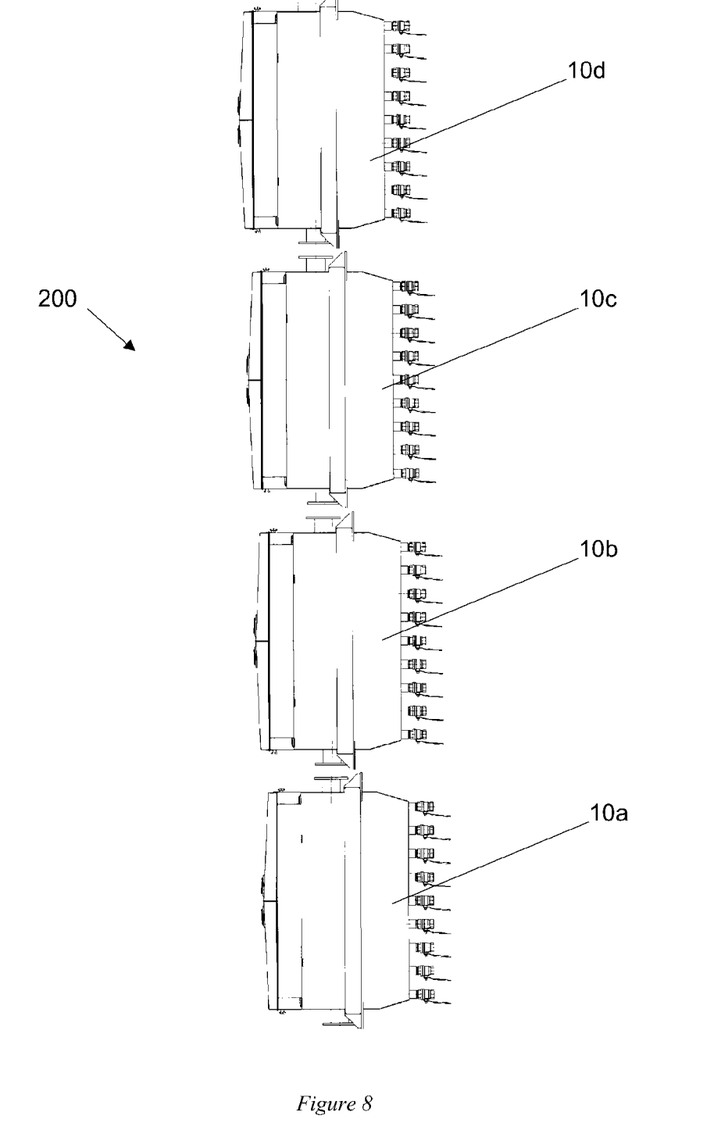
FIG. 8 is a side elevation of an arrangement of electrowinning cells according to an embodiment of the present invention.

Referring to FIG. 8, there is shown an arrangement 200 of electrowinning cells 10 for extracting metals from an electrolyte solution, wherein each electrowinning cell 10 comprises; a housing 20, a solution inlet 30, a solution outlet 40, a plurality of anodes 50, a plurality of cathodes 60 and a product outlet 70, wherein each anode 50 is configured to maintain a gap between a lower edge 52 of the anode 50 and the housing 20, so that at least a portion of fluid flow of solution is directed below the anode 50, and wherein at least one cathode 60 is secured at a lower edge 62 to the housing 20 to prevent fluid flow below the lower edge 62 of the cathode 60; wherein the arrangement 200 comprises a plurality of electrowinning cells 10 connected to one another in series, so that fluid flow of solution is directed from a first cell 10a via subsequent downstream cells 10b to a final cell 10c, and wherein the cells 10 are arranged with different degrees of anode permeability.

An upstream cell in the arrangement may comprise a greater degree of anode permeability than at least one of the downstream cells.

In use, pregnant electrolyte solution from an elution column enters the electrowinning cell 10 via the inlet 30.

The arrangement of the anodes 50 and cathodes 60 causes the solution entering the inlet 30 to flow downwardly across the face of the anode 50, under the lower edge 52 of the anode 50, and to the subsequent cathode 60.

Where the cathode 60 is free of metal deposition, the cathode 60 remains permeable and the solution is able to pass through the cathode 60 to the subsequent anode 50.

Consequently, the fluid flow of solution will initially be concentrated toward the lower portion of the cell as a whole.

As metal deposition continues, the build-up of deposited metal on the cathode 60 begins to hinder the fluid flow path, and make the cathode 60 impermeable at the region where the metal has been plated to such an extent.

This causes the fluid flow of solution to travel upwardly, to find a portion of the cathode 60 which is more permeable.

Consequently, as the cathode 60 experiences greater levels of metal deposition, rather than the cell 10 requiring shut down, removal of cathodes and cleaning before the operation can continue, the fluid flow path of solution is altered and metal deposition continues onto relatively free areas of cathode 60.

Once the cathode 60 becomes entirely impermeable, as the upper edge 64 of the cathode 60 is located beneath the level of the solution, the solution passes over the cathode 60.

As the upper edge 54 of the anode 50 is above the level of the solution, the fluid flow path of the solution is then directed down between the cathode 60 and the subsequent anode 50.

The solution is therefore directed along a tortuous flow path from the inlet 30 to the outlet 40, the flow path being dictated by the configuration of the impermeable plates of the anodes 50, and the cathodes 60 having varying degrees of permeability depending on the level of metal deposition.

Conventional electrowinning cells 1010 suffer with inefficiency as the deposited metal prevents adequate flow of solution through the cathode 1060.

The anodes 1050 are conventionally plates with an array of holes through to enable the passage of solution.

As metal is deposited onto the steel wool of the cathodes 1060, the available surface area for further cathodic deposition is reduced, and the capacity for the cathode 1060 to operate effectively is therefore reduced until it is removed and cleaned of the deposited metal.

As the fluid flow path of solution is from the inlet 1030 to the outlet 1040, the cathode 1060 closest to the inlet 1030 is the first to receive metal deposition.

The anodes 1050 permit passage of solution, and do not experience deposition of metal, so fluid flow remains unencumbered.

As the cathodes 1060 become impermeable once the metal is deposited to an extent which inhibits flow of solution, the fluid flow is directed over the top of the cathode 1060.

Once the cathodes 1060 begin to experience greater levels of deposition, the fluid flow of solution tends to become focussed toward the top of the cell, flowing over the cathodes 1060 and through the anodes 1050.

The result of this change in flow is that the deposition on the cathodes 1060 is not evenly distributed, and high levels of deposition are experienced on the cathodes 1060 located closest to the inlet 1030, and/or on the upper portions of cathodes 1060 primarily.

The cell 1010 cannot function efficiently until the cathode 1060 has been removed and cleaned.

If the metal deposition were more evenly distributed, the removal and cleaning operation could be carried out more infrequently.

Secondary metals, particularly silver, may be present and deposited in much greater volumes than the gold. This prevalence of secondary metals exacerbates the problem of clogging.

In comparison, the flow path of the solution of the present invention is directed across a more tortuous path once the deposition reaches a level where a cathode 60 becomes impermeable.

The use of impermeable anodes 50, and spaces between the lower edge 52 of the anode 50 and the housing 20, forces the solution to the lower portion of the cell 10 at each anode 50.

Alternatively, where the anode 50 may be permeable, the space between the lower edge 52 of the anode 50 and the housing, directs a portion of the solution to the lower portion of the cell 10 at the anode 50.

This directing of fluid flow under the anode 50, rather than through, before flowing up potentially the full height of the cathode 60, allows metal deposition to continue until all cathodes 60 are sufficiently plated, rather than the cleaning requirement being dictated by the condition of the first cathode 60.

The continued fluid flow is assisted by the adequate spacing of the anodes 50 and cathodes 60.

The anodes 50 and cathodes 60 may be located using spacers to prevent movement and ensure that the spaced between the anodes 50 and cathodes 60 is maintained.

The space between the anodes 50 and cathodes 60 may be determined by the requirement for adequate fluid flow, and by the predicted build-up of metal on the cathodes 60, and its effect of the cross-sectional area of the fluid flow passage.

The tortuous fluid flow path results in a greater distance travelled by the solution from inlet 30 to outlet 40, and exposes the solution to a greater surface area of anodes 50 and cathodes 60 when compared to a conventional cell 1010.

This results in greater and more even levels of deposition, so that the cell 10 only requires shut down for cleaning of the cathodes 60 once all the cathodes 60 are sufficiently deposited, as opposed to shut down being determined by the first cathode having deposition levels which prevent fluid flow.

The result of the improved deposition is that shut down of a cell 10 according to the present invention is required much less frequently than with conventional cells 1010.

The greater deposition also allows for a much smaller cross section of cell 10.

Conventional cells 1010 typically have dimensions of 600 mm×600 mm, or 800 mm×800 mm, resulting in a cross sectional area of 0.64 $m^2$ or 0.36 $m^2$.

A process comprising conventional cells 1010 typically involves multiple cells 1010 arranged in parallel, with the solution being circulated through the array of cells 1010 at a high flow rate over a set period, for example 20 hours.

The parallel arrangement of conventional cells 1010 means that the effective cross-sectional area of the array is multiplied, so 8 cells for example, each having a cross sectional area of 0.64 $m^2$ results in a total area of 5.12 $m^2$.

This large total area requires the high flow rate to circulate the solution effectively, which is turn requires higher capacity pumps and associated hardware.

Once the solution is sufficiently barren, with the metal being electrowon and deposited onto the cathodes, the process is halted, and the barren electrolyte solution is directed back to the preceding leach circuit in a single batch.

The addition of a batch quantity of solution over a short period causes the concentration of cyanide in the leach tank to spike, leading to a significant variation in the chemical balance in the leach circuit, and associated problems with recovery.

The point at which the solution is sufficiently eluted may not coincide with the point at which the cathodes require removal for cleaning, and the circuit may therefore be required to shut down for either of at least two reasons.

The cell 10 of the present invention overcomes the problem of batch addition of solution to the leach circuit by working in a continuous cycle, as opposed to a batch process.

Barren solution is continuously fed at low rates to the leach circuit, resulting in a predictable chemical balance in the leach circuit and reduction of problems resulting therefrom, as a chemical imbalance resulting from the addition of a large quantity of solution is removed.

The cell 10 of the present invention has a much smaller cross-sectional area, for example dimensions of 300 mm×300 mm, which result in a cross-sectional area of 0.09 $m^2$.

Furthermore, the cells 10 of the present invention may be arranged in series, with the solution passing from a first cell 10 to each subsequent cell 10 in a stream of cells 10.

Such an arrangement is enabled by the cell 10 according to the present invention, and its capability to continue functioning until the cathodes 60 have reached a much higher deposition level than with conventional cells 1010.

As conventional cells 1010 suffer with blockage and uneven deposition, parallel arrangement of cells 10 is required to alleviate the issue and continue operation where one cell 1010 requires shut down.

Conventional cells 1010 arranged in series would result in impractical frequency of shut downs, as the entire stream would be required to be shut down once a single cell 1010 reached a level of deposition which prevented the solution from flowing into the subsequent cells 1010.

The reduced frequency of shut downs enabled by the cell 10 of the present invention, allow the series arrangement to become a practical choice.

The series arrangement of the cells 10 of the present invention further enables the desired level of metal disposition to be attained in a single pass, as the total surface area of cathode 60 to which the solution is exposed in a single pass is much greater than with conventional cells 1010.

The length of the cell 10 and the number of cells 10 arranged in series can be determined to ensure that this is the case.

The cross-sectional area of the cell 10 may be less than 0.2 $m^2$.

The total cross-sectional area of an arrangement of cells 10 through which the solution is passed may be less than 0.2 $m^2$.

It is however recognised that for higher capacity plants more than one stream of cells 10 can be used.

The maximum flow rate of solution through the cell 10 may be 10 $m^3/h$.

Alternatively, the maximum flow rate of solution through the cell 10 may be 5 $m^3/h$.

Alternatively, the maximum flow rate of solution through the cell 10 may be 3 $m^3/h$.

The smaller cross-sectional area is also beneficial for a number of other reasons, for example capital cost and use of space on site.

Although the cell 10 of the present invention ensures more even deposition than conventional cells, and thus enables the arrangement 200 of electrowinning cells 10 connected in series, the deposition levels from a first cell 10a to a final cell 10c are still uneven.

The first cell 10a may reach a high level of deposition more quickly that downstream cells 10b and the final cell 10c.

Such high deposition may have the effect of restricting the flow along the series arrangement, due to the deposition throttling the flow in the upstream cells.

The arrangement 200 of electrowinning cells 10, in which the degree of permeability of the anode 50 of each cell is different, may ameliorate this problem and result in reduced deposition of upstream cells, and greater deposition of downstream cells, thus resulting in a more balanced overall deposition across the series.

By using a single pass circuit, the requirement for a shut down due to barren solution is removed, as the solution is passed continuously and gradually to the leach circuit.

Although shut down of the circuit is still required for cleaning of the cathodes 60, this is at much a reduced frequency when compared with conventional cells 1010.

The removal of one instance of potential shut down, and the reduced frequency of shut downs for cleaning operations results in an increase in efficiency, as a result of the continued operation of the cell 10, and also as a result of the cleaning operation itself, which carries a risk of loss of product.

Conventional electrowinning cells 1010 require that the cathodes 1060 are removed from the cell, and the deposited metal is pressure washed from the cathode 60 and collected.

The removal of the cathode 1060 carries risk in that it may be knocked or scraped, causing damage or loss of product.

The pressure washing procedure also carries risk, as spray may cause washed metal to travel far from the cathode 1060 being washed. As a result, the environment in which the washing takes place must be carefully considered to prevent loss of product.

In a further embodiment of the present invention, the cell 10 comprises product outlets 70 located between the dividers 62, below the anodes 50.

The cleaning operation of the present invention does not require the removal of the cathodes 60 from the housing 20 of the cell 10. The lid can be opened and the cathodes 60 can be pressure washed in situ, with the washed product being directed to the product outlets 70.

The anodes 50 may be removed to assist with the pressure washing procedure, and allow greater access.

The product outlets 70 may feed a drainage channel, thus enabling the product collected to be channelled to a single location for easy retrieval.

The location of the electrical connections 96, which may be external to the housing 20, provides a number of benefits.

The external location of the connections 96 keeps them separate from the corrosive environment inside the housing 20, thus increasing longevity and reducing requirement for maintenance.

The conductor bars 80 may be bolted to the bus bars 90 with the connections 96 allowing for ease of access whilst the lid remains closed. This can assist with maintenance as the connection 96 is outside of the hazardous environment of the housing 20.

As the connections 96 are external to the housing, protective covers 110 are used to prevent operators from contacting the live connections 96.

When suction is applied to the suction nozzle 100, the holes 112 along the length of each cover allow cooling air to be drawn in, over the electrical connections 96 and into the housing 20.

The suction draws the corrosive gases from inside the housing 20 and the cooling airflow helps keep the electrical connections 96 from overheating.

The cooling air flow further contributes to the longevity of the electrical connections 96.

It is recognised that the term impermeable, as used throughout the specification, refers to liquid permeability, particularly of the electrolyte solution, and the resultant capability to direct flow thereof.

Modifications and variations as would be apparent to a skilled addressee are deemed to be within the scope of the present invention.

What is claimed is:

1. An electrowinning cell for extracting metals from an electrolyte solution, the electrowinning cell comprising a housing, a solution inlet, a solution outlet, a plurality of anodes, a plurality of cathodes for metal deposition and a product outlet, wherein at least one anode is impermeable and configured to permit fluid flow of a solution along a fluid flow path through the electrowinning cell, a first portion of the fluid flow path extending between a lower edge of each anode and the housing, so that solution passing from the inlet to the outlet is directed below each anode, wherein said plurality of cathodes are permeable when free of metal deposition; and wherein a second portion of the fluid flow path for the solution passes either through a cathode or over a cathode dependent on the permeability of said cathode, said permeability of said cathode being dependent on degree of metal deposition on each cathode.

2. An electrowinning cell according to claim 1, wherein at least one cathode is secured at a lower edge to the housing to prevent fluid flow below the lower edge of the cathode.

3. An electrowinning cell according to claim 1, wherein the cell is configured to extract gold and silver from an electrolyte solution, and wherein the electrolyte solution contains at least 50% as much silver as gold.

4. An electrowinning cell according to claim 1, wherein a gap between the lower edge of the anode and the housing defines a pocket that has a cross sectional area equal to or greater than the horizontal cross-sectional area between the anode and the cathode.

5. An electrowinning cell according to claim 1, wherein the electrowinning cell comprises an optimal surface level of solution, wherein the anode comprises an upper edge located above the surface level, and wherein the cathode comprises an upper edge below the surface level.

6. An electrowinning cell according to claim 5, wherein the upper edge of the cathode is between 10 mm and 20 mm below the surface level.

7. An electrowinning cell according to claim 5, wherein the upper edge of the anode is between 5 mm and 10 mm above the surface level.

8. An electrowinning cell according to claim 1, wherein the plurality of anodes and cathodes are arranged using spacers to ensure that spaces between plates are maintained, so that the fluid flow path of solution between each anode and cathode is not encumbered.

9. An electrowinning cell according to claim 1, wherein the anodes and cathodes are arranged in pairs, so that fluid flow of solution is directed along said second portion of said fluid flow path below each anode, and prevented from flowing below each cathode, in an alternating series.

10. An electrowinning cell according to claim 1, wherein the cathodes are configured as frames wrapped with steel wool.

11. An electrowinning cell according to claim 1, wherein a lower edge of each cathode is secured to a divider on the base of the housing.

12. An electrowinning cell according to claim 1, wherein the electrowinning cell comprises a plurality of product outlets at the base of the housing, wherein each product outlet is positioned between dividers, below each respective anode.

13. An electrowinning cell according to claim 5, wherein the anodes and cathodes are secured proximal the upper edge to a conductor bar.

14. An electrowinning cell according to claim 13, wherein the cell comprises two external bus bars, one running down each side of the cell, with the conductor bars of the anodes connected to one bus bar, and the conductor bars of the cathodes connected to the other bus bar.

15. An electrowinning cell according to claim 14, wherein the bus bars are connected to the conductor bars with bolted electrical connections located external to the housing of the cell.

16. An electrowinning cell according to claim 14, wherein the electrowinning cell further comprises an exhaust nozzle, configured to have suction applied.

17. An electrowinning cell according to claim 16, wherein the bus bars and electrical connections are protected by covers to prevent damage to the electrowinning cell, or injury to operators, wherein the covers comprise holes positioned proximal the electrical connections, so that when suction is applied to the exhaust nozzle, air is drawn through the holes and over the electrical connections.

18. An electrowinning cell for use in a gold or silver recovery circuit, the electrowinning cell comprising a housing, a solution inlet, a solution outlet, a plurality of anodes, a plurality of cathodes for metal deposition, a product outlet and a fluid flow path for a solution through the electrowinning cell, wherein at least one anode is configured to maintain a gap between a lower edge of the anode and the housing, so that a first portion of the fluid flow path for the solution is directed below the anode, wherein at least one cathode is secured at a lower edge to the housing to prevent fluid flow below the lower edge of the cathode;

wherein said plurality of cathodes are permeable when free of metal deposition; and wherein a second portion of the fluid flow path for the solution passes either through a cathode or over a cathode dependent on the permeability of said cathode, said permeability of said cathode being dependent on degree of metal deposition on each cathode.

19. An arrangement of electrowinning cells for extracting metals from an electrolyte solution, wherein each electrowinning cell comprises: a housing, a solution inlet, a solution outlet, a plurality of anodes, plurality of cathodes and a product outlet, wherein each anode is configured to maintain a gap between a lower edge of the anode and the housing, so that at least a portion of fluid flow of solution is directed below the anode, and wherein at least one cathode is secured at a lower edge to the housing to prevent fluid flow below the lower edge of the cathode; wherein the arrangement comprises electrowinning cells connected to one another in series, so that fluid flow of solution is directed from a first cell, via subsequent downstream cells to a final cell, and wherein the cells are arranged with different degrees of anode permeability.

20. An arrangement of electrowinning cells according to claim 19, wherein an upstream cell in the arrangement comprises a greater degree of anode permeability than at least one of the downstream cells.

21. An electrowinning cell according to claim 1, wherein a second portion of the fluid flow path for the solution passes over said cathode when impermeable due to degree of metal deposition.

22. An electrowinning cell according to claim 21, wherein said second portion of the fluid flow path for the solution extends parallel to a surface of said impermeable cathode and over said cathode.

* * * * *